(12) United States Patent
Simon

(10) Patent No.: US 9,194,954 B2
(45) Date of Patent: Nov. 24, 2015

(54) METHOD FOR GEO-REFERENCING AN IMAGED AREA

(75) Inventor: Alain Simon, Les Mesnuls (FR)

(73) Assignee: Thales, Courbevoie (FR)

( * ) Notice: Subject to any disclaimer, the term of this patent is extended or adjusted under 35 U.S.C. 154(b) by 380 days.

(21) Appl. No.: 13/516,728

(22) PCT Filed: Dec. 15, 2010

(86) PCT No.: PCT/EP2010/069697
§ 371 (c)(1),
(2), (4) Date: Jun. 16, 2012

(87) PCT Pub. No.: WO2011/073227
PCT Pub. Date: Jun. 23, 2011

(65) Prior Publication Data
US 2012/0257792 A1 Oct. 11, 2012

(30) Foreign Application Priority Data
Dec. 16, 2009 (FR) ...................... 09 06095

(51) Int. Cl.
*G06K 9/32* (2006.01)
*G06K 9/00* (2006.01)
(Continued)

(52) U.S. Cl.
CPC .................. *G01S 17/89* (2013.01); *G01C 11/06* (2013.01); *G01C 11/34* (2013.01); *G06T 7/0028* (2013.01); *G06T 7/0042* (2013.01); *G06T 17/05* (2013.01); *G06T 2207/10032* (2013.01)

(58) Field of Classification Search
None
See application file for complete search history.

(56) References Cited

U.S. PATENT DOCUMENTS 6,009,190 A * 12/1999 Szeliski et al. ................ 382/154
6,757,445 B1 * 6/2004 Knopp ......................... 382/285
(Continued)

OTHER PUBLICATIONS

"From point-based to feature-based aerial triangulation," T. Schenk, ISPRS Journal of Photogrammetry & Remote Sensing 58 (2004), pp. 315-329.*

*Primary Examiner* — Wenpeng Chen
(74) *Attorney, Agent, or Firm* — Baker & Hostetler LLP

(57) ABSTRACT

A method for geo-referencing an area by an imaging optronics system which comprises acquiring M successive images by a detector, the imaged area being distributed between these M images, with M≥1. It comprises: measuring P distances $d_1$, $d_2, \ldots, d_P$ between the system and P points of the area, called range-found points, with P≥3, distributed in K of said images with 1≤K≤M; acquiring the positioning $x_m$, $y_m$, $z_m$ of the detector at acquisition of the M images; measuring the attitude $\phi_m$, $\theta_m$, $\psi_m$ of the detector at acquisition of the M images; acquiring the coordinates in these K images of image points $(p_1, q_1), (p_2, q_2), \ldots, (p_P, q_P)$ corresponding to the P range-found points; and estimating the parameters of exposure conditions $x_e$, $y_e$, $z_e$, $\psi_e$, $\theta_e$, $\phi_e$ corresponding to the M images as a function of positionings, of attitudes, distances and coordinates of the image points, to correct errors on the parameters $x_m$, $y_m$, $z_m$, $\psi_m$, $\theta_m$, $\phi_m$ of each of the M images.

6 Claims, 7 Drawing Sheets

(51) Int. Cl.
*G01S 17/89* (2006.01)
*G01C 11/06* (2006.01)
*G01C 11/34* (2006.01)
*G06T 7/00* (2006.01)
*G06T 17/05* (2011.01)

(56) References Cited

U.S. PATENT DOCUMENTS

| | | | |
|---|---|---|---|
| 7,925,114 B2* | 4/2011 | Mai et al. | 382/284 |
| 2002/0060784 A1 | 5/2002 | Pack et al. | |
| 2003/0044085 A1* | 3/2003 | Dial et al. | 382/293 |
| 2003/0160757 A1* | 8/2003 | Shirai et al. | 345/156 |
| 2004/0004706 A1* | 1/2004 | Uezono et al. | 356/3 |
| 2004/0167709 A1* | 8/2004 | Smitherman et al. | 701/208 |
| 2004/0233461 A1* | 11/2004 | Armstrong et al. | 356/620 |
| 2004/0234123 A1* | 11/2004 | Shirai et al. | 382/154 |
| 2005/0031197 A1* | 2/2005 | Knopp | 382/154 |
| 2006/0215935 A1 | 9/2006 | Oldroyd | |
| 2007/0103671 A1 | 5/2007 | Ash | |
| 2007/0104354 A1* | 5/2007 | Holcomb | 382/109 |
| 2008/0123994 A1* | 5/2008 | Schultz et al. | 382/284 |
| 2008/0205707 A1* | 8/2008 | Braunecker et al. | 382/106 |
| 2008/0310757 A1* | 12/2008 | Wolberg et al. | 382/285 |
| 2009/0034795 A1 | 2/2009 | Bridenne et al. | |
| 2009/0087013 A1* | 4/2009 | Westrick | 382/100 |
| 2009/0141966 A1* | 6/2009 | Chen et al. | 382/154 |
| 2009/0154793 A1* | 6/2009 | Shin et al. | 382/154 |
| 2010/0013927 A1* | 1/2010 | Nixon | 348/144 |
| 2011/0096957 A1* | 4/2011 | Anai et al. | 382/106 |
| 2011/0109719 A1* | 5/2011 | Wilson et al. | 348/42 |

* cited by examiner

METHOD FOR GEO-REFERENCING AN IMAGED AREA

CROSS-REFERENCE TO RELATED APPLICATIONS

This application is a National Stage of International patent application PCT/EP2010/069697, filed on Dec. 15, 2010, which claims priority to foreign French patent application No. FR 0906095, filed on Dec. 16, 2009, the disclosures of which are incorporated by reference in their entirety.

FIELD OF THE INVENTION

The present invention refers to the geo-referencing of an area by means of an optronics system, with a decametric performance class, and more particularly in strongly oblique exposure conditions.

BACKGROUND

FIG. 1 illustrate the positioning (or geo-locating) errors for a point P of an area, induced by measurement uncertainties in strongly oblique exposure conditions encountered, for example, in aero-terrestrial applications in which the optronics system is situated close to the ground compared to the distance to the object (airborne, the ratio of the distance to the object to flight altitude is in the order of 5—and even more—for low-altitude flights or terrestrial applications).

FIG. 1A illustrates a planimetric error $\epsilon_P$ induced by a measurement uncertainty $\epsilon_h$ of the vertical position h of the optronics system.

The following applies:

$$\epsilon_P = \epsilon_h/\tan\theta = (r/h)\epsilon_h \approx \epsilon_h/\theta$$

An error $\epsilon_h$ of 20 m for example, for an altitude greater than that of the object by 20 kft, induces, for the positioning of a point P situated at 30 km, an error $\epsilon_P$ of 120 m.

FIG. 1B illustrates an error $\epsilon_P$ induced by a measurement uncertainty $\epsilon_\theta$ of the bearing by which the point P is seen from the optronics system, i.e. for an orientation error in the vertical plane of camera optical axis (or COA).

The following applies:

$$\epsilon_P = r\cdot\epsilon_\theta/\sin\theta = r\cdot\epsilon_{74}\cdot(h^2+r^2)^{1/2}/h = r^2\cdot\epsilon_\theta(1+(h/r)^2)^{1/2} \approx r^2\cdot\epsilon_\theta/h$$

In the same conditions as in the preceding example, an error $\epsilon_\theta$ of 1 mrd for example, which corresponds to a very favorable case, induces an error $\delta_\theta$ on the positioning of the point P of 150 m.

These errors may be aggregated to ultimately introduce an error of approximately 270 m for the positioning of the point P.

Such errors are found nevertheless also in low-altitude terrestrial optronics systems (helicopters, mini UAVs) which are fixed, for example, at the top of a vehicle mast or a ship's mast. However, most of these systems have to acquire and characterize the positioning of objects moving at great distance with decametric efficiency.

The influence of measurement errors on the geo-locating error of a point P has just been illustrated. Geo-referencing consists of geo-locating all the points of an imaged area and not a single point.

To be able to have a geo-referencing of decametric class in the above mentioned conditions, it is usual practice to use post-processing operations on the ground generally performed by a specialist operator who realigns the images acquired by means of geographic references (or landmark by preferably having world or at least sufficient coverage for the expressed requirements). However, these landmarks, generally taken from exposures close to the vertical, are difficult to pair with the strongly oblique image automatically, and are subject to the aging of the information.

One of the difficulties is to acquire this performance rapidly and at any point of the globe without having to use true world coverage information, which is difficult to pair with the image straight away, but not subject to the aging of the information.

One solution, implemented in a related field, for establishing digital elevation models, or DEM, consists in performing, using a in flight laser, a number of beam distance and direction measurements in favorable acquisition conditions. In practice, this application is performed with low exposure constraints making it possible to acquire the information in conditions which are close to the vertical and with a fairly low flight altitude so that the orientation errors are not too detrimental for direct location performance. The systems used do not generally offer any associated imaging and, when they do have it, the two systems are not coupled. The aim of these airborne laser plotting techniques is solely to use distance measurements in order to reconstruct DEMs and the coupling with an image is not provided in the applications encountered which are all to do with distant acquisition conditions of strongly oblique aims. Moreover, these approaches favorably lend themselves to the updating of information produced and to thereof control the stereo plotting sites which involve producing, in ground stations and under the control of an operator, digital terrain models (DTM) and ortho-images on the imaged areas.

Another solution commonly used to produce ortho-images, DTMs, in order to ultimately produce geographic maps and vector databases (DB), uses aero-triangulation techniques based on acquisitions of optical or radar images, from aircraft or from satellites.

The sensors on satellites are commonly used to cover large areas based on image acquisition and position and attitude measurements; also, this is done on the scale of a territory and more. The control of the internal consistency of the optical images, based on the observation of the forms of the objects of the scene after rectification, is produced by means of a matrix detector. It is ensured by using the trajectory and/or scanning techniques, while ensuring an overlapping and a contiguous reconstruction of the information which can then be oriented as a whole based on a few landmarks in order to correct the remaining orientation biases. These spatio-triangulation techniques are also indicated when the acquisitions are produced from observation or remote detection satellites.

The aero-triangulation applications correspond to acquisitions with wide measurement bases (a base being the displacement of the detector between two images) and therefore to a relatively low rate of acquisition (of the order of 0.1 Hz) compared to strategic applications (some tens of Hz) reaching an acquiring rate of approximately 10,000 images in 3 minutes.

Here again, the images are processed and used in a ground station under the control of an operator. In his or her work producing information, he or she also has:
- access to external reference data having an already qualified geo-referencing
- the facility to identify the objects and the relevant details of the image and associate them with the reference data in order to have landmark points in the image in order to enhance thereof the geo-referencing.

The enhancing of the geo-referencing of the images by an operator on the ground constitutes a process that is effective with regard to the result and, at the same time, restricted with respect to the implementation time, the need for reference geographic data, the correlating work and time involved— even more when the information associated with the image to be geo-referenced is of lesser quality.

The aero-triangulation works determine the absolute orientation of all the images. This makes it possible, if necessary, to assemble them as a single image (or block of images) and to correct the result by means of inputting homologous or/and landmark points as well as to provide a manual or visual performance check. The need for an operator in the loop to control the quality of assembly of the images and of the geo-referencing of an area covered by a number of images is unfeasible in the conditions of use of applications notably requiring a much shorter implementation time, close to real time.

In addition to this performance problem linked to the exposure conditions (or CDPV), there is the need to have:
 a better resolution of the images in order to view details, that is to say, an enhancement of the resolution with which the ground distance is represented in the image, or "GSD" (Ground Sample Distance"), and
 a greater coverage on the ground, that is to say, an increase of the areas imaged so as to be of use to operations of an environmental, security, strategic or tactical nature, without in any way penalizing the range of acquisition of the information to be geo-referenced.

The coverage of large areas is ensured by displacing the detector or/and by using larger detectors or/and greater fields.

The coverage of a large area by a satellite means is facilitated by its displacement in its orbit and a good relative quality between the exposure parameters because:
 the quality of the positioning relies on measurements and a permanent control of the trajectography constrained by the celestial mechanics equations. These allow for a simple and rigid modeling of its form over time,
 the consistency of attitude through the stability of the trajectory and associated control means.

For the terrestrial applications, the displacement of the detector is not always possible and its size is sometimes limited with regard to the areas to be acquired. The coverage of large areas by an aeroterrestrial means is more difficult since:
 in airborne cueing, the trajectory is ensured by a maneuvering platform,
 in terrestrial cueing, the platform is fixed or has little mobility.

The use of large detectors, with materials of well-controlled quality, first of all favored the use of array detectors. However, the difficulty associated with finely knowing the pointing over time (between the directions of the image corresponding to the direction of the array) degrades the internal consistency of the image (which allows for control of its geometry) and therefore one of the strong characteristics of optronics. Moreover, the integration time has to be reduced in order to be adapted to the scrolling effects linked to the displacements of the detectors relative to the imaged area.

The possibility of using greater fields to cover large areas runs counter to the requirement in GSD for a given acquisition distance range. To remedy this constraint, rapid scanning-based acquisition modes such as frame-step (or step staring) are used and the number of detectors on one and the same platform is increased.

For the military applications, large quantities of well-resolved images have to be able to be geo-referenced rapidly.

SUMMARY OF THE INVENTION

The aim of the invention is to overcome these drawbacks of implementation times, the need for an operator on the ground, and for external reference data, of insufficient resolution of the scene in the image, while observing the constraints of decametric class geo-referencing, and by adapting to the requirement the surface area on the ground imaged in conditions of strongly oblique exposure and significant acquisition range.

The geo-referencing method according to the invention is based on the provision of two types of information that have strong accuracy and precision:
 a number of distance measurements in one and the same image information item, for which the accuracy is metric,
 the angular deviations of orientation between the pixels of the range-found directions for which the precision is of the order of the angular size of the pixel (10 µrad), relies on:
   the quality with which the image coordinates associated with the distance measurements can be determined,
   the good internal geometrical consistency of the optronics image and the capacity for pairing between images presenting an overlap that are both less than or of the order of a pixel.

An algorithmic processing operation computes the condition parameters of the exposures of each image based on the preceding information.

Thus, a few accurate distance measurements and precise angular deviations (using the internal consistency information of the optronics images and/or the precision of the inertial measurements) allow for a better geo-referencing of the area assuming ground that has little unevenness or by having an DTM. The quality of the geo-referencing of the imaged area then benefits globally from the accuracy of the distance measurements and locally from the geometrical consistency imparted by the relative quality of the optronics angular measurements.

According to the balance sheet of the errors produced, the consistency regarding the respective quality of the information used, which is of the order of a meter for each contribution (a few pixels of size 10 µrad at 30 km for 20 kft of altitude represents a distance of 1.5 m), will be noted.

More specifically, the subject of the invention is a method for geo-referencing an area by means of an imaging optronics system which comprises a step of acquiring M successive images by means of a detector, the imaged area being distributed between these M images, with M≥1. It is mainly characterized in that it also comprises the steps:
 of measuring P distances $d_1, d_2, \ldots d_P$ between the system and P points of the area, called range-found points, with P≥3, these range-found points being distributed in K of said images with 1≤K≤M,
 of acquiring the positioning $x_m, y_m, z_m$ of the detector at the times of acquisition of the M images,
 of measuring the attitude $\phi_m, \theta_m, \psi_m$ of the detector at the times of acquisition of the M images,
 of acquiring the coordinates in these K images of the points called image points $(p_1, q_1), (p_2, q_2), \ldots, (p_P, q_P)$ corresponding to the P range-found points,
 and a step of estimating the parameters of exposure conditions $x_e, y_e, z_e, \phi_e, \theta_e, \psi_e$ corresponding to the M images as a function of positionings, of attitudes, of distances and of coordinates of the image points, in order to reduce the errors on the parameters $x_m, y_m, z_m, \phi_m, \theta_m, \psi_m$ of each of the M images.

This method allows for the geo-locating of an entire imaged area, not limited to a single point of the scene:
- with a decametric class accuracy, notably in strongly oblique exposure conditions often encountered in the airborne applications and in the situations where the detector is located close to the ground, since the performance is largely insensitive to the attitude measurement errors (greatly attenuating the sensitivity of the planimetric positioning error linked to the bearing orientation error and that linked to the rotation error about the COA),
- autonomously, that is to say without the intervention of an operator and without accessing reference data,
- in real time, since the information is typically accessed at the rate of the range finder (typically 10 Hz) and without having to implement any post-processing or specific information enhancement means,
- with the most extensive and best resolved coverage of the scene despite competition between the acquisition range and the resolution of the ground in the image (Ground Sampling Distance GSD),
- discretely, because it is possible to geo-locate an object which has not been directly illuminated by the range finder, which avoids having to perform an active measurement on a sensitive object to be located, and thus represents an advantage for tactical operations that require a level of discretion.

According to one embodiment of the invention with M≥3, the M images of the area are acquired in succession; these images present areas of overlap two by two and the method comprises a step of extracting homologous primitives in the areas of overlap of these M images and a step of mapping the images two by two on the basis of on these homologous primitives.

According to a particular implementation of the preceding embodiment, when P=K, the range-found points are respectively at the center of each of the images.

Preferably, when the optronics system is fixed, the parameters describing the positioning $(x_e, y_e, z_e)$ are estimated only once.

When the optronics system comprises positioning means and it moves on a known trajectory, the positionings $x_e, y_e, z_e$ can be estimated on the basis of the successive position measurements and a mode of the trajectory.

When the optronics system accesses (or includes) measurement means indicating its positioning, its speed, its acceleration; then its trajectory is modeled in parametric form. The positionings $x_e, y_e, z_e$ are then estimated for the positions at the times corresponding to that of the acquisitions (images and range findings).

According to a first variant, when there are a number of range-found points in one and the same image, the distance measurements are acquired simultaneously for these points.

According to another variant, when there are a number of range-found points in one and the same image, the distance measurements are acquired in succession for these points, the time to acquire each distance being less than the ratio of the time to acquire this image to the number of these points in the image.

Also the subject of the invention is a geo-referencing optronics system which comprises a detector having an optical axis (COA), means for positioning this detector, means for measuring the attitude of the detector, a range finder harmonized with the COA of the detector and a processing unit linked to the abovementioned elements, and capable of implementing the method when P=K.

According to one feature of the invention, the range finder emitting a laser beam is equipped with means for splitting or deflecting the emitted laser beam, for the analysis of the signals received in order to determine the time of flight (ToF) and the orientation of the beam relative to the image by means of a processing operation suitable for implementing the method as described.

BRIEF DESCRIPTION OF THE DRAWINGS

Other features and advantages of the invention will become apparent on reading the following detailed description, given as a nonlimiting example and with reference to the appended drawings in which.

From one figure to another, the same elements are identified by the same references.

DETAILED DESCRIPTION

Figure 2:
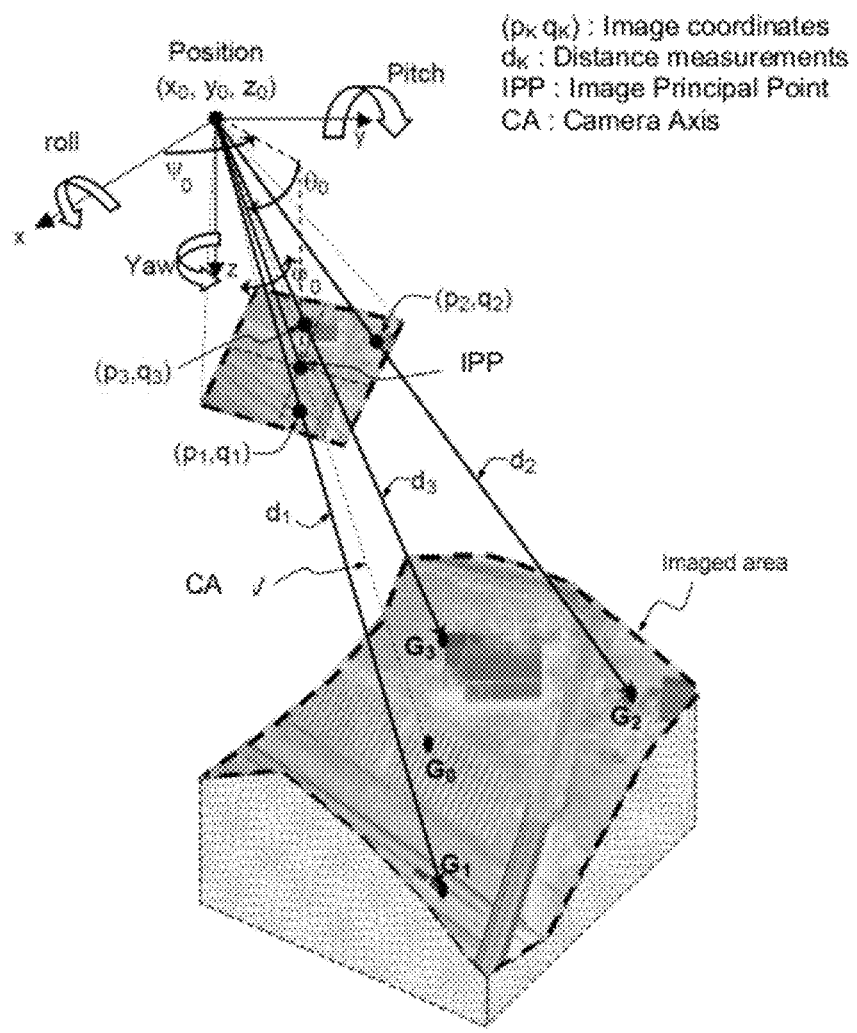

The geo-referencing error of an area is conditioned by the quality of six external parameters, also called exposure parameters, indicated in FIG. 2 and which represent:
- the absolute position of the detector, obtained by positioning means and which, in a local geographic coordinate system, is characterized by:
  - its planimetric coordinates x and y, and,
  - its altimetric coordinate z,
- the absolute attitude of the image obtained by inertial means such as the navigation inertial system (INS) or/and inertial measurement unit (IMU) and which makes it possible to characterize:
  - the direction of the COA defined by its azimuth $\psi$ and its bearing $\theta$ also quantifying its depression,
  - a 3rd rotation $\phi$ of the image around the COA also called swing.

The position of the detector (or the station camera) is preferably used in a Cartesian geographic coordinate system:
either a geocentric global system (or ECEF, standing for Earth Centered Earth Fixed),
or a topocentric local system (or ENU, standing for East North Up), or in an equivalent way, since it simply swaps the axes x and y and inverts the axis z, a local geographic coordinate system also called NED (for North East Down).

The measurement of this position is acquired on the platform or the sensor if its mounting on the platform permits it (example of terrestrial cameras). To have position information of good accuracy, it is preferable to use information generated from a global navigation satellite system (GNSS) and ideally hybridized with the available inertial information (such as, for example, the INS of the platform, the IMU of the sensor). The GNSS systems envisaged rely in particular these days on the GPS and its complement EGNOS, Galileo when the latter becomes available and GLONASS when its renovation is completed.

The 6 exposure parameters $(x_m, y_m, z_m, \phi_m, \theta_m, \psi_m)$ are determined with a quality that is conditioned by that of the measuring instruments and of the associated processing units.

The calibration of the parameters internal to the optronics system (focal and optical distortion of the imaging device, principal image point, etc.) is assumed to be done elsewhere. However, the method also makes it possible to estimate these parameters and more accurately determine, for example, the particular values that the parameters of an optical distortion model assume in the operating conditions of the sensor (temperature and mechanical stresses).

Figure 8:
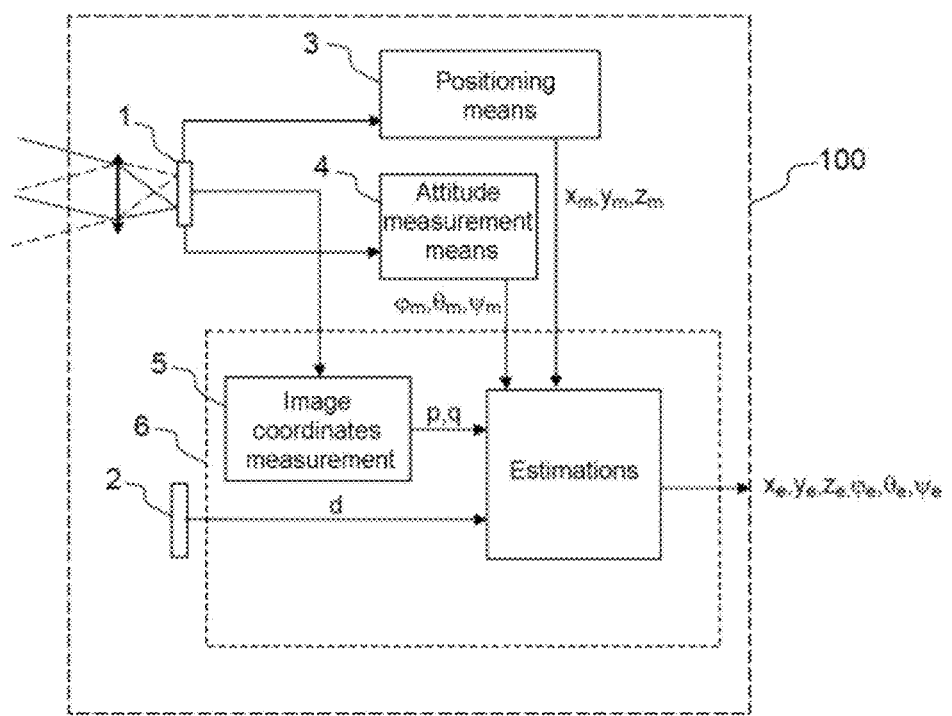

The method for geo-referencing an area is performed by means of an imaging optronics system 100 shown in FIG. 8 which comprises:
a detector 1, such as a camera,
a range finder 2, the COA of which is harmonized on the optronics channel of the detector,
means 3 for positioning the detector, such as a GNSS device, or IMU possibly hybridized using an assistance device such as a GPS, a star sensor, a horizon sensor, etc.,
inertial means 4 for measuring the attitude of this detector, such as an inertial unit, etc.,
means 5 for acquiring the coordinates of the image points corresponding to the range-found points using an appropriate technological device (mirror, optical fibers, specific detector, etc.) and appropriate signal processing,
a processing unit 6 including means for synchronizing the position and attitude measurements of the image acquired and the distances, and including the means 5 for extracting and measuring the coordinates of the image points. The time-stamping reference for the synchronization of the measurements is preferably made on the information that has the highest rate of image acquisitions or of distance measurements.

Generally, the method comprises the following steps:
acquisition of M successive images, by means of the detector 1, the area imaged being divided up between these M images, with M≥1,
measurement by the range finder 2 of P distances $d_1, d_2, \ldots d_P$ between the system and P points of the area called range-found points, with P≥3, these range-found points being distributed in K of said images with 1≤K≤M,
acquisition by the positioning means 3 of the positioning $x_m, y_m, z_m$ of the detector at the times of acquisition of the M images,
measurement by the inertial means 4 of the attitude $\phi_m, \theta_m, \psi_m$ of the detector 1 at the times of acquisition of the M images,
acquisition by the means 5, in these K images, of the coordinates of the points called image points $(p_1, q_1), (p_2, q_2), \ldots, (p_P, q_P)$ corresponding to these P range-found points,
estimation by the processing unit 6 of the exposure condition parameters $(x_e, y_e, z_e, \phi_e, \theta_e, \psi_e)$ corresponding to the M images, as a function of the measurements allowing for the positioning $(x_m, y_m, z_m)$ and of attitudes of the detector $(\psi_m, \theta_m, \phi_m)$, of the P distances and of the coordinates of the P image points, in order to correct the errors on the parameters $(x_0, y_0, z_0, \psi_0, \theta_0, \phi_0)$ of the M images.

Generally, the estimation of the parameters characterizing the CP of each of the K images is performed using:
positioning and attitude measurements,
distance measurements and,
coordinates of the image points,
a scene model or hypothesis for the ground.

Four uses are described below which use a number of distance measurements over an imaged area in order to enhance the knowledge concerning the camera parameters (CP) describing the exposure station and image attitude, provided by the measurements, or even to determine these parameters without angular measurements.

Application (1): enhancement of attitude and height with 3 distances. A contiguous image area is used which has 3 distance measurements in order to explicitly determine the value of the 2 angles ($\psi_0$ and $\theta_0$) characterizing the orientation of the COA (excluding last rotation about the COA ($\phi_0$) and the height z0 of the sensor (see FIG. 2).

Figure 1A:
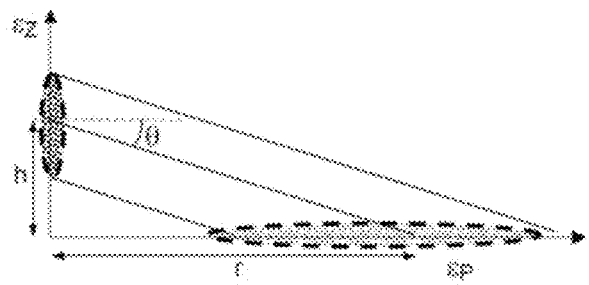
FIGS. 1A and 1B schematically illustrate the geo-location errors in oblique exposure conditions, FIG. 2 schematically represents, for an image, the parameters of the exposure conditions and other information used in the geo-referencing method according to the invention, FIG. 3 schematically represents an exemplary image used in the context of a first embodiment of the invention based on a single image, with a number of range-found points, FIG. 4 schematically illustrates the mode of operation of a range finder equipped with deflection means, FIG. 5 schematically illustrates an example of a second embodiment of the method according to the invention based on M images, with M=2, and a number of range-found points in each image, FIGS. 6A and 6B schematically illustrate another example of this second embodiment of the method according to the invention based on M images, with M=4, and one or more range-found points in each image, with the step of acquiring the images and the range-found points (FIG. 6A), and the step of extracting homologous points in the images (FIG. 6B), FIGS. 7A and 7B schematically illustrate an example of a third embodiment of the method according to the invention based on M images, with M=4, and a single range-found point at the center of 3 of these images, with the step of acquiring the images and the range-found points (FIG. 7A), and the step of extracting homologous points in the images (FIG. 7B), FIG. 8 schematically represents an exemplary optronics system according to the invention, FIG. 9 illustrate a process and a result of densification of the altitude in triangular form starting from an DTM grid.
Figure 1B:
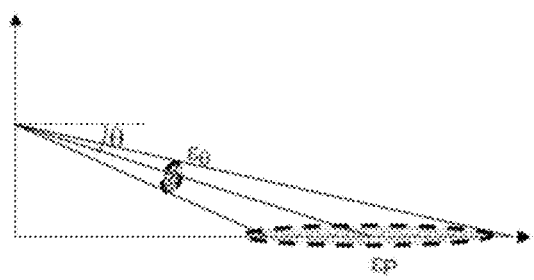

It is important to recall that these 3 parameters comprise the two parameters for which the measurement errors have the most critical influence on the geo-referencing of the image in strongly oblique sight (see FIG. 1). Their determination based on measurements for which the accuracy and precision are better than those provided by the angular measurements constitutes a strong point of the method according to the invention.

This application constitutes both a didactic illustration and a presentation of a basic concept of the process.

Application (2): densification of the earth's surface over the imaged area. A redundancy of the distance and image measurements in relation to the number of parameters to be estimated is used. Beyond the 3 minimum distances necessary, each new distance provides a relevant measurement concerning the distance to the scene at the point targeted and therefore, for a position of the sensor and an attitude of the image that are well known, relevant information with a view to positioning the point targeted on the ground. Determining the altitude and the position of scattered points densifies the initial knowledge of the ground model. The process proposes to take into account all the measurements in full in a joint estimation of the exposure parameters and of the scene parameters. However, and notably in order to illuminate the meaning thereof, it is also possible to use some of the measurements to estimate the CPs and the rest to know the altitude over the places on the ground that have been the subject of a measurement.

Application (3): aero-lateration with a set of images and of distance measurements. Use is made of a set of overlapping images, observations of homologous primitives between images, distance measurements on the images, a scene model and approximate measurements making it possible to initialize the exposure parameters of the images in order to enhance the exposure parameters of each image and those describing the scene model. The application is essentially focused on the estimation of the external parameters but the internal parameters consisting of the focus, the coordinates of the image principal point (IPP) and the description of the optical distortion can also be estimated in the context of this application. The redundancy of the distance measurements on the image is used in order to densify the scene model and, in this way, enhance the mappings between the corresponding features (CF) and the positioning of the extractions in the iterations of the estimation. This application presents the implementation of the process in the context of an operational application in its most general dimension.

Application (4): use of landmarks. At least 3 distance measurements are used on points of an imaged area that is paired with a geo-referenced reference image datum in order to explicitly compute the external exposure parameters and enhance the knowledge thereof.

The text below gives a few details for the implementation of these applications.

Application (1): Enhancement of the CPs with 3 Distances

For a perspective exposure, the colinearity equations which link the image and terrain coordinates make it possible to write the location function associating a point of the ground "G" of coordinates $(x_k, y_k, z_k)$ with an image pixel as:

$$\begin{pmatrix} x_k - x_0 \\ y_k - y_0 \\ z_k - z_0 \end{pmatrix} = \mu_k R(\psi_0, \theta_0, \varphi_0) \begin{pmatrix} p_k - p_0 \\ q_k - q_0 \\ -f_0 \end{pmatrix} \quad \text{(equation 1)}$$

The above expression contains the following:
the focus "$f_0$" expressed in pixels,
the coordinates $(p_0, q_0)$ of the image principal point (IPP) in the image coordinate system (intersection of the optical axis with the image plane),
the factor $\mu_k$ representing the scale factor,
the rotation matrix R describing the attitude of the image and the elements $R_{ij}$ of which are trigonometric functions of the angles $(\psi, \theta, \phi)$,
the position of the sensor (corresponding to the image principal point) in the geographic coordinate system (x,y,z) denoted $(x_0, y_0, z_0)$,
the coordinates of the range-found points $(p_k, q_k)$ in the image coordinate system and $(x_G, y_G, z_G)$ in the geographic coordinate system.

The rotation matrix R characterizing the attitude of the image is written in its minimal representation as a function of the 3 Euler angles $(\psi_0, \theta_0, \phi_0)$:

$$R = R_{\psi/z} R_{\theta/z} R_{\varphi/z} = \begin{bmatrix} R_{11} & R_{12} & R_{13} \\ R_{21} & R_{22} & R_{23} \\ R_{31} & R_{32} & R_{33} \end{bmatrix}$$

or, in more developed form:

$$R = \begin{bmatrix} \cos\psi_0\cos\theta_0 & -\sin\psi_0\cos\varphi_0 + \cos\psi_0\sin\theta_0\sin\varphi_0 & \sin\psi_0\sin\varphi_0 + \cos\psi_0\sin\theta_0\cos\varphi_0 \\ \sin\psi_0\cos\theta_0 & \cos\psi_0\cos\varphi_0 + \sin\psi_0\sin\theta_0\sin\varphi_0 & -\cos\psi_0\sin\varphi_0 + \sin\psi_0\sin\theta_0\cos\varphi_0 \\ -\sin\theta_0 & \cos\theta_0\sin\varphi_0 & \cos\theta_0\cos\varphi_0 \end{bmatrix}$$

The equation (1) is given without distortion on the image. In practice, this is evaluated by means of a grid or a parametric model linking the position of an ideal pixel (without distortion) of image coordinates (p, q) to the position of the real pixel (with distortion) of coordinates (p',q') in the image. The main effect of the distortion is to introduce a radial deformation on the perfect pixel coordinates (p,q) by transforming them into (p',q') according to the following form:

$$p' = p_c + L(r)(p - p_c)$$

$$q' = q_c + L(r)(q - q_c)$$

$$r = \sqrt{(p - p_c)^2 + (q - q_c)^2}$$

in which the pixel of coordinates $(p_c, q_c)$ corresponds to the center of the distortion, also called principal point of symmetry (PPS).

The function L(r) is defined for r>0 and L(0)=1 with an approximation by Taylor development to the order N:

$$L(r) = 1 + K(r) = 1 + \sum_{n=1}^{N} K_n r^n$$

By taking into account the fact that the distortion corrections remain small compared to the size of the images, the above equations are inverted by being written:

$$p = \frac{p' + K(r)p_c}{1 - K(r)} \approx p' - K(r)(p' - p_c)$$

$$q = \frac{q' + K(r)q_c}{1 - K(r)} \approx q' - K(r)(q' - q_c)$$

Thus, it will be noted that the account taken of the distortion is limited, in this type of modeling, to a wider linear estimation of parameters. This step therefore represents a fairly low complexity which will make it possible:
either to envisage the use of values of parameters already measured in a calibration step on the ground,
or to estimate these parameters, in addition to the external parameters, within the proposed process, by introducing, for example to the order 1, an additional modeling parameter $K_1$.

Out of the following 3 observable quantities:
the coordinates $z_0$ corresponding to the dimension of the sensor in the geographic coordinate system,
the rotation $\phi$ of the image about the exposure axis (also called swing or derotation),
the rotation $\theta$ of the image relative to the horizontal plane (defining the inclination in bearing),
the particular aim is to calculate the bearing which represents the contribution of preponderant sensitivity to the attitude errors.

For N range-found image points, it is possible to write the following 2 N relationships based on the location function of the sensor (equation 1) to write the following relationships:

$$x_k - x_0 = \frac{R_{11}p_k + R_{12}q_k - R_{13}f}{R_{31}p_k + R_{32}q_k - R_{33}f}(z_k - z_0);$$

$$y_k - y_0 = \frac{R_{21}p_k + R_{22}q_k - R_{23}f}{R_{31}p_k + R_{32}q_k - R_{33}f}(z_k - z_0)$$

The equation for measuring the distance between the position of the sensor and a particular point on the ground is also expressed as:

$$d_k = \sqrt{(x_k-x_0)^2+(y_k-y_0)^2+(z_k-z_0)^2}+v_k \quad \text{(equation 2)}$$

By replacing the latter in the preceding expressions and by disregarding the measurement noise v, the following observation expression is obtained by making use of the properties of orthogonality of rotation matrix "R":

$$R_{31}p_k + R_{32}q_k - R_{33}f = \pm \frac{z_k - z_0}{d_k}\sqrt{p_k^2 + q_k^2 + f^2} \quad \text{(equation 3)}$$

We note that the quantities $R_{3n}$ involve only the angles $\phi$ and $\theta$ which reflects the non-observability of $\psi$ (angle of rotation about the vertical axis). In this expression, the sign depends on the colinearity factor $\mu$ which can be constructed as being >0 (by placing the image opposite or in front of the optical center—negative snapshot). This operation is made possible by the central symmetry about the IPP by inverting the 3 axes of coordinates (p, q, f) of the image coordinate system.

By using $m_k$ to designate the quantity which depends only on the measurements (image coordinates of the point k, distance to the ground associated with the direction of the point k and height of the sensor $z_k$) and the information or the assumption concerning the ground height ($z_0$):

$$m_k = \pm \frac{z_k - z_0}{d_k}\sqrt{p_k^2 + q_k^2 + f^2} \quad \text{(equation 4)}$$

Expressions are obtained for the two angles, when the 3 image points (pk, qk) are not aligned. Without describing the writing details thereof, the computations make it possible to express:

the bearing angle according to the form:

$$\sin\theta_e = \frac{(m_2 - m_3)(q_1 - q_2) - (m_1 - m_2)(q_2 - q_3)}{(q_2 - q_3)(p_1 - p_2) - (q_1 - q_2)(p_2 - p_3)} \quad \text{(equation 5)}$$

the swing angle according to the form:

$$\tan\varphi_e = \frac{m_1^2(p_2 - p_3) + m_2^2(p_3 - p_1) + m_3^2(p_1 - p_2)}{m_1^2(q_3p_2 - q_2p_3) + m_2^2(q_1p_3 - q_3p_1) + m_3^2(q_2p_1 - q_1p_2)} \quad \text{(equation 6)}$$

the dimension of the sensor, by positing:

$$A_2 = \mu_1(q_2 - q_3) + \mu_2(q_3 - q_1) + \mu_3(q_1 - q_2)$$

$$A_1 = \mu_1(q_2 - q_3)z_1 + \mu_2(q_3 - q_1)z_2 + \mu_3(q_1 - q_2)z_3$$

$$A_0 = \mu_1(q_2 - q_3)z_1^2 + \mu_2(q_3 - q_1)z_2^2 + \mu_3(q_1 - q_2)z_3^2$$

$$\mu_k = \frac{p_k^2 + q_k^2 + f^2}{d_k^2}$$

or, a dimension of the sensor satisfying the expression:

$$[\mu_1(q_2 - q_3) + \mu_2(q_3 - q_1) + \mu_3(q_1 - q_2)]z_0^2 - 2[\mu_1(q_2 - q_3)z_1 +$$
$$\mu_2(q_3 - q_1)z_2 + \mu_3(q_1 - q_2)z_3]z_0 + \mu_1(q_2 - q_3)z_1^2 +$$
$$\mu_2(q_3 - q_1)z_3^2 + \mu_3(q_1 - q_2)z_3^2 = 0$$

$$z_e = \frac{A_1 \pm \sqrt{A_1^2 - A_2 A_0}}{A_2}$$

or even:

(equation 7)

$$z_e = [\mu_1(q_2 - q_3) + \mu_2(q_3 - q_1) +$$
$$\mu_3(q_1 - q_2)]^{-1}\Big[\mu_1(q_2 - q_3)z_1 + \mu_2(q_3 - q_1)z_2 +$$
$$\mu_3(q_1 - q_2)z_3 \pm \sqrt{\begin{aligned}&\mu_1\mu_2(q_3 - q_1)(q_3 - q_2)(z_1 - z_2)^2 + \\ &\mu_2\mu_3(q_1 - q_2)(q_1 - q_3)(z_2 - z_3)^2 + \\ &\mu_3\mu_1(q_2 - q_3)(q_2 - q_1)(z_3 - z_1)^2\end{aligned}}\Big]$$

It will be noted that the circularity of these expressions as a function of the measurements (1, 2, 3) reflects the interchangeability of the role of the 3 points ($P_1$, $P_2$, $P_3$).

Moreover, it will be noted that:
the analytical form and the simplicity of these expressions are favorable for studying the sensitivity of the values obtained. It is possible, for example, to use the covariance propagation technique, to study in particular the impact:
of the error on the parameters (angles and height) as a function of error on the 3 measurements (p,q), the 3 distances and the position z of the points on the terrain,
of distribution of the measurements in the images or on the ground ($\Delta z_k$) on the result according to the values of the CP.
the sensor and ground heights are involved only as difference which corresponds to the fact that the attitude of the image is known relatively in relation to the ground,
to have values z of the plane it is possible to use the approximate attitude information and/or a ground model (z(x,y)). By obtaining better image attitudes and sensor heights, the knowledge concerning the ground height can be enhanced. The process can then be reiterated starting from better information than that associated with the initial measurements. This makes it possible notably to enhance the knowledge as to the height of the points of the ground by use of the DTM and to linearize the observation system as close as possible to the true value in cases where redundant measurements (more than 3 distances) are processed.

Application (2): Modeling and Densification of the Earth's Surface on the Imaged Area For the processing of the terrain, different uses can be proposed depending on whether the ground has to be:
used as simple available information; it is in this case completely known according to the hypothesis or the available more or less fine model,
densified by the estimation of complementary heights on the places of the distance measurements, according to a finer mesh than the original model known a priori, refined or estimated as a whole based on the measurements taken by the sensor.

To use an available model, the proposed approach consists in modeling the surface of the scene in parametric form and in using polynomial-based functions to develop it. For this, a discretization of the area of interest is adopted in the form of a regular grid. The height information situated on the nodes (i,j) of the grid is used to determine the parameters "$h_{ij}$" of a model of the form:

$$z(x, y) = \sum_{i,j}^{I,J} c_{ij}(x, y) h_{ij} \quad \text{(equation 8)}$$

This development of the altitude (or height) uses basic functions "$c_{ij}$" in polynomial form to the powers of x and y according to different representations, such as:

bounded support polynomials of the form:

$$c_{ij}(x, y) = \left(1 - \frac{x - x_{ij}}{x_{i+1,j} - x_{ij}} \frac{x - x_{ij}}{x_{i,j} - x_{i-1,j}}\right)\left(1 - \frac{y - y_{ij}}{y_{i+1,j} - y_{ij}} \frac{y - y_{ij}}{y_{i,j} - y_{i-1,j}}\right)$$

splines leading to the expression, over the area, of the altitude according to the known values on the nodes of a regular grid [P×Q] such as:

$$z(x,y) = (1 y \ldots y^{N-1}) U_{N \times P} H_{P \times Q} V_{Q \times M} (1 x \ldots x^{M-1})^T$$

in which U and V are fixed matrices, of respective dimensions N×P and Q×M. The matrix H of dimension (P×Q) represents the matrix of the coefficients which are estimated. For N=M=4 and on a support of the normalized grid at [−1, 1]$^2$, the matrix U=V$^T$ and is written, for example:

$$U = \frac{1}{4} \begin{pmatrix} 0 & 4 & 0 \\ -2 & 0 & 2 \\ 3 & -6 & 3 \\ -1 & 2 & -1 \end{pmatrix}$$

In practice, one of the preceding two developments can be used to express z in one and the same form of linear function of the coefficients $h_{ij}$ which are known according to the information available a priori.

Figure 9A:
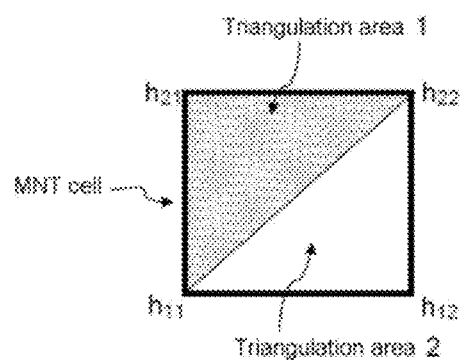
Figure 9B:
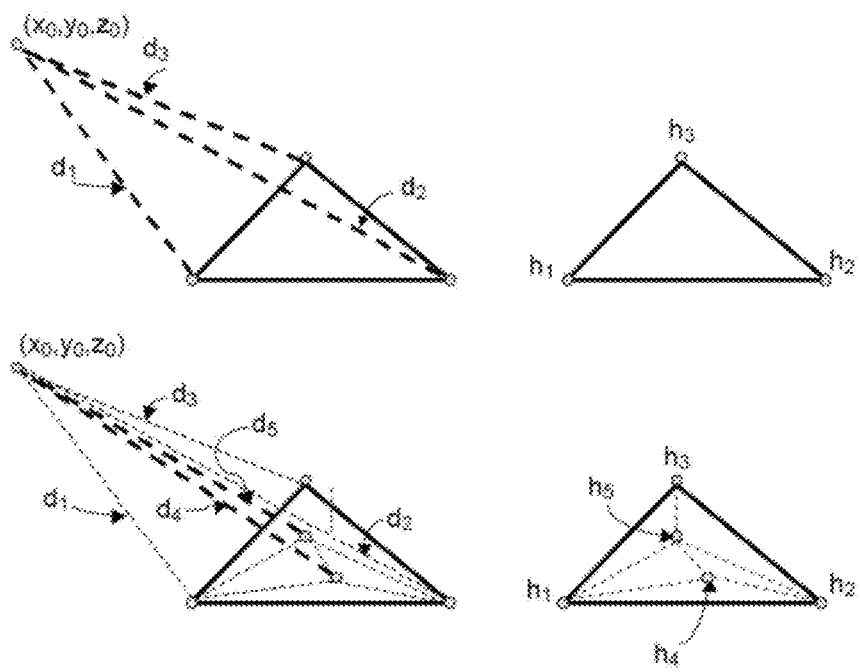

To densify an existing model, use is made once again of the preceding modeling (equation 8) and available initial information on the terrain. It is proposed to densify the original spatial information known on the nodes of a regular grid, the pitch of which corresponds, for example, to an DTM standard of level 1 (pitch of approximately 90 meters at the equator). This DTM makes it possible to initialize triangular cells as indicated in FIG. 9a. To produce the densification, the altitude is determined excluding the initial points of the grid based on the available observations then the surface model is completed by triangulation as presented in FIG. 9b. This figure illustrates, for example, how the determination of 2 points within an initial facet of the grid, on which the altitude varies over a single plane, leads to its subdivision into 5 facets each corresponding to a different plane of space.

With a number of distance measurements>3, the complementary information can be used to densify the scene model on the points where the distance measurements are performed. Since the projections of the distances to the ground are not distributed according to a regular grid, the densification obtained leads to an enrichment of an DTM in triangular form without that posing a problem as to its future use (FIG. 9).

To estimate a model, a hypothesis or an existing "rough" model on the area, or an estimation obtained on the n$^{th}$ iteration, is used as a starting point. A process for estimating or making consistent all the available information such as that described in the application 3 is used to find a correction to be applied to the altitude in the following form:

$$z_n = h(x_n, y_n) + \Delta z_n = \sum_{i,j} c_{ij}(x, y) h_{ij} + \Delta z_n$$

in which the hij items are the altitudes determined on the nodes of the grid in a preceding iteration of the estimation process.

We note that the observation equation (equation 3) remains valid if the altitude zk is modeled by a more general form.

$$R_{31} p_k + R_{32} q_k - R_{33} f = \quad \text{(equation 9)}$$

$$\pm \frac{\sum_{i,j}^{I,J} c_{i,j}(x, y) h_{ij} - z_0}{d_k} \sqrt{p_k^2 + q_k^2 + f^2}$$

Thus, the altitude development coefficients can be grouped together with the rotation elements to resolve the linear system:

$$AX = B + v$$

in which v is a term of the first order accounting for the measurement errors.

In the absence of initial altitude information, it is also possible to estimate a ground model. The simplest consists in modeling the surface as a medium plane on the scale of the area covered by the images. The altitude then changes over a plane of the space as:

$$z = h_{00} + h_{10} x + h_{01} y$$

In this expression, $h_{00}$ represents the altitude at the origin whereas $h_{10}$ and $h_{01}$ respectively represent the slopes in the two directions x and y. With this planar model, the following will, for example, be written:

$$X = [R_{31} \quad R_{32} \quad h_{00} \quad h_{10} \quad h_{00}]^T$$

$$A = \begin{pmatrix} p_1 - p_K & q_1 - q_K & 1/d_K - 1/d_1 & x_K/d_K - x_1/d_1 & y_K/d_K - y_1/d_1 \\ \vdots & \vdots & \vdots & \vdots & \vdots \\ p_{K-1} - p_K & q_{K-1} - q_K & 1/d_K - 1/d_{K-1} & x_K/d_K - x_{K-1}/d_{K-1} & y_K/d_K - y_{K-1}/d_{K-1} \end{pmatrix}$$

$$B = -z_0 \begin{bmatrix} \frac{\sqrt{p_1^2 + q_1^2 + f^2}}{d_1} - \frac{\sqrt{p_K^2 + q_K^2 + f^2}}{d_K} \\ \vdots \\ \frac{\sqrt{p_{K-1}^2 + q_{K-1}^2 + f^2}}{d_{K-1}} - \frac{\sqrt{p_K^2 + q_K^2 + f^2}}{d_K} \end{bmatrix}$$

With 6 distance measurements, the quantity X is determined accurately (to within the measurement noise ν), which gives both:
- the information on the CPs as indicated previously, and
- the parameters characterizing the earth's surface by an approximate plane.

With more measurements, the preceding system is estimated:
- either by least squares by processing all the observations,
- or iteratively as and when distance observations become available. This approach makes it possible to refine the estimation of the parameters of the system over time.

Thus, the proposed process is capable of densifying or enhancing an initial approximate ground model of the scene or to construct it ab initio.

Figure 10:
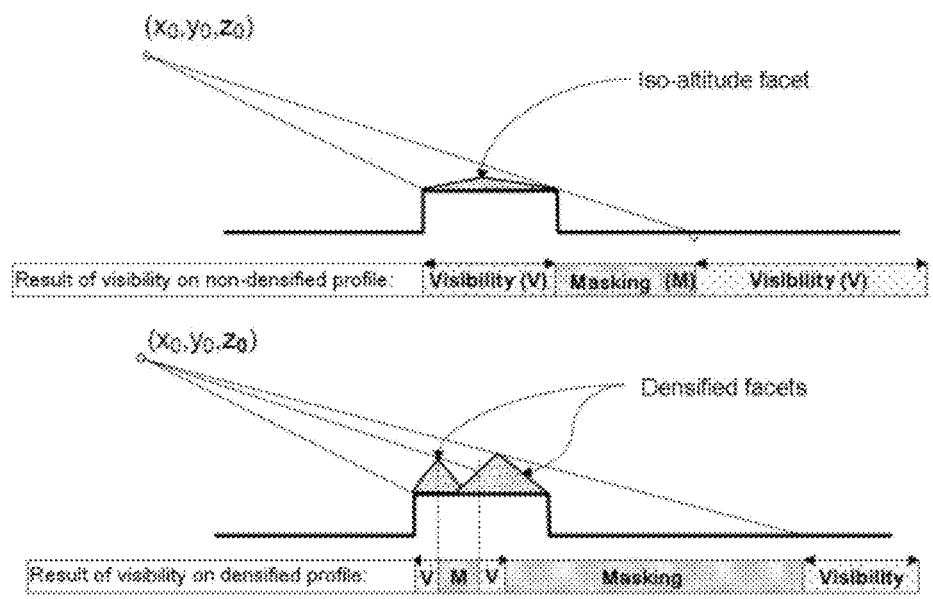
FIG. 10 illustrates the influence of a result of densification of the scene model on an inter-visibility computation.

The processes of densification or estimation of the model representing the surface of the ground have various advantages since they notably allow for better performance levels for:
- location based on passive techniques which proceeds by intersection of the direction of a pixel with the scene model,
- applications relying on the visibility or inter-visibility (FIG. 10):
  - either directly from the position of the sensor in a direction or over a given area on an area profile,
  - or indirectly between third-party systems which would use the information generated within the sensor.

Application (3): Aero-Lateration

We propose this name to recall the fact that the proposed process constitutes an extension of the conventional aero-triangulation process which proceeds without using the distance measurement. For this application, it is noted that:
- $E[X]$ the expected value of the random variable X,
- $\delta(X) = X - X^*$, in which $X^*$ designates the true, or ideal, value of the quantity X,
- $\Lambda_X$ the covariance matrix of X.

The quantities $\Lambda$ and $\sigma$ represent the a priori covariances on the parameters.

For this application, there are:
K images for which the aim is to enhance the exposure parameters $\Theta_k$ (k=1 ... K). We note that with just the 6 external parameters, the vector $\Theta_k$ is written $(x_k, y_k, z_k, \phi_k, \theta_k, \psi_k)^T$. The exposure parameters are initialized, for each image, with the measured values $(x_m, y_m, z_m, \phi_m, \theta_m, \psi_m)$ and the associated covariance $\Lambda_m$. The deviation or the residue between the initial value of the vector of the exposure parameters $\Theta$ and its ideal value $\Theta^*$ as well as its covariance $\Lambda_\Theta$, expressed by the following expressions:

$$\delta_{\Theta_k} = \Theta_k - \Theta^*$$

$$\Lambda_{\Theta_k} = E[\Theta_k \Theta_k^T]$$

image points P of coordinates $(p_{ki}, q_{ki})$ mapping on an object $G_i$ of ground coordinates $(x_i, y_i, z_i)$ on the image k, have, according to the location function $G_\Theta$ characterizing the exposure geometry, a residue and a covariance:

$$\delta_{P_{ik}} = (x_{Gi} - x_{ki} \quad y_{Gi} - y_{ki} \quad z_{Gi} - z_{ki})$$

$$\begin{pmatrix} x_{ki} \\ y_{ki} \\ z_{ki} \end{pmatrix} = G(\Theta_k, p_{ki}, q_{ki})$$

$$\Lambda_{P_{ik}} = E\left[\begin{pmatrix} x_{ki} \\ y_{ki} \\ z_{ki} \end{pmatrix} (x_{ki} \quad y_{ki} \quad z_{ki})\right]$$

In the preceding expression, the quantity $z_{ki}$ is evaluated according to the scene model:

$$z_{ki} = \sum_{m,n} c_{mn}(x_{ki}, y_{ki}) h_{mn}$$

sensor-terrain distances measured on the point on the ground $G_i$ from the sensor position $S_k$ which has the following residues and covariance:

$$\delta_d = d_{ki} - d_{ki}^*$$

$$\Lambda_{d_{ki}} = E[d_{ki} d_{ki}^T] = \sigma_{d_{ki}}^2$$

$$d_{ki} = \sqrt{(x_{Gi} - x_{ki})^2 + (y_{Gi} - y_{ki})^2 + (z_{Gi} - z_{ki})^2}$$

one-off landmark points $A_i$ (see application 4) of geographic coordinates $(x_i, y_i, z_i)$, for which, for one of them, the residue and the covariance are considered:

$$\delta_{A_i} = A_i - A_i^*$$

$$\Lambda_{A_i} = E[A_i A_i^T]$$

Having an image and observation set, the exposure parameters of the set of images are then obtained by minimizing the quadratic sum "J" of the different preceding residues, or the expression:

$$\Theta = \min J$$

$$J = J_M + J_\Theta + J_T$$

the contribution of the observations is given by:

$$J_M = \sum_{i=1}^{I} \left[ \sum_{k=1}^{K} \left\{ (\delta_{P_{ik}} \Lambda_{P_{ik}}^{-1} \delta_{P_{ik}}^T) + \sum_{k=1}^{K} \left( \frac{\delta_{d_{ik}} \delta_{P_{ik}}^T}{\sigma_{d_{ik}}^2} \right) \right\} + \delta_{A_i} \Lambda_{A_i}^{-1} \delta_{A_i}^T \right]$$

the contribution of the exposure parameters is given by:

$$J_\Theta = \sum_{k=1}^{K} \delta_{\Theta_k} \Lambda_{\Theta_k}^{-1} \delta_{\Theta_k}^T$$

the contribution of the terrain model is given by:

$$J_T = \sum_{i=1}^{K} z_i \Lambda_{T_i}^{-1} z_i^T$$

Without seeking to resolve the system specifically, since it depends on the number of images, of link primitives and on the occurrence of the presence of the primitives over all the images, the structure of the equations to be resolved leads to a matrix linear system. The size of the system, which depends on the number of images, of CF and on the number of distances, is fairly large but the latter is also very hollow because the CFs couple only a small number of images. The matrix of the system becomes all the more hollow as the number of appearances of each primitive on more than two images decreases and the number of images increases.

It will be noted that another possible approach consists in proceeding in two steps:
1) orienting all the images relative to one another by a conventional aero-triangulation technique (without taking into account the distance measurements) to obtain an image block of consistent geometry. This step refines in particular the relative orientations between the images and makes it possible to obtain an image block constructed from contiguous images.
2) processing the preceding image block as a single image according to the application (1) by having at least 3 distances.

Application (4): CP by Landmark Point Range-Finding

This application makes it possible to compute the exposure parameters by range-finding landmark points and enhancing the values of the parameters obtained from approximate measurements. The procedure is qualified as an active plotting procedure. For this application, the optronics system accesses geographic information enabling it, by appropriate processing, to pair this information which may be reduced to a minimum of 3 landmark points. It is then possible to estimate all of the 6 external parameters by range-finding objects of known coordinates (landmark points).

The approximate measurements of position of the sensor and of its image attitude make it possible in particular to map the range-found points in the image to a reference image datum in order to have coordinates of these terrain points. In detail, this approach uses the measurements ($x_m$, $y_m$, $z_m$, $\psi_m$, $\theta_m$, $\phi_m$), supplying CPs making it possible to geo-reference the image approximately and to fix the geographic coordinates with the primitives extracted by means of the location function; of these, the parameter $\Theta_m$ is initialized according to the measurements. This geo-referencing of the primitives makes it possible to pair them by an automatic procedure with the landmarks of the reference datum and thus to correct the geographic coordinates which had initially been assigned to them from the measurements of the CPs. The primitives can then be considered to be landmarks $G_{ke}$ for which the coordinates on the ground ($x_k$, $y_k$, $z_k$) have a quality of the reference data (class of a few meters), for which the image coordinates ($p_k$, $q_k$) are known according to the processing of the signal with an extraction quality of the order of a pixel and for which the distance to the scene ($d_k$) is measured according to the range finder with a metric quality.

This approach differs from the preceding one by the fact that there is reference information in the scene (the geographic coordinates of the points on the ground $G_{ke}$).

For the problem of conventional plotting, which relies in principle on image coordinates (and therefore directions) and landmark points to estimate all of the 6 parameters (including the position of the sensor and the attitude of the image), a generalization is proposed by adding the distance measurements to the traditional information. This complementary provision of information presents two advantages:
the possibility of computing the position of the sensor and the attitude of the image without resolving strongly nonlinear equations as for the conventional plotting process,
the provision of better performance on the estimated CPs.

This active plotting technique proceeds as follows:
the location function (equation 1) written for each landmark of the image is used,
this equation ($x_0$, $y_0$, $z_0$) includes the coordinates of the sensor in a Cartesian coordinate system and ($\psi_0$, $\theta_0$, $\phi_0$) are the angles which are initially obtained according to the approximate measurements, ($p_0$, $q_0$) are the coordinates of the principal point of image (taken hereinafter at the image center to simplify the writing of the equations) and $f_0$ is the focal length of the sensor (in pixel units). It will be noted that the proportionality factor $\mu_k$ is specific to each point of the terrain or direction of the image.
i. For each landmark point $G_k$ on the ground for which the coordinates ($x_k$, $y_k$, $z_k$) are known and which is visible in the imaged area, there are: measurements of image coordinates ($p_k$, $q_k$) and of the distance $d_k$, the colinearity equation presents the unknown $\mu_k$,
ii. for each image there are 6 beam, or exposure, unknowns ($x_0$, $y_0$, $z_0$, $\psi_0$, $\theta_0$, $\phi_0$),
iii. In total, for M landmark points there are 3M colinearity equations and a number of 6+M unknowns (beam parameters+M values $\mu_k$). With a number of points M≥3 (to ensure 3M≥6+M), there is then sufficient information to estimate the exposure parameters.

The following computation scheme is then proposed:
i. The position of the sensor is computed according to the distance measurements on the 3 points according to (equation 2).
By writing these 3 equations, 2 linear equations are obtained at $x_0$, $y_0$ and $z_0$ by difference of two of them to the third. These make it possible to obtain, for example, $z_0$ as linear expression of $x_0$ and of $y_0$. These expressions transferred to the quadratic expression give $z_0$ as the solution of an equation of the second degree and therefore 2 solutions at z for the position of the sensor. Thus, the two linear equations make it possible to obtain a position ($x_e$, $y_e$, $z_e$) for each of the two values of z, the solution retained corresponding to that closest to the measurements ($x_m$, $y_m$, $z_m$).
ii. The factor $\mu_k$ is then computed for each landmark by writing the equality of norm between the 2 vectors on either side of the colinearity equation and, by exploiting the norm properties of the columns and rows of the vectors of the rotation matrix and the nullity of their scalar product, the following is obtained:

$$\mu_k = \frac{d_k}{\sqrt{(p_k - p_0)^2 + (q_k - q_0)^2 + f_0^2}}$$

$$k = \{1, 2, 3\}$$

iii. The attitude ($\psi_e$, $\theta_e$, $\phi_e$) of the image is then computed with two possible approaches:
1. either by using the available measurements and the quantities computed previously. By using the measurements, there is an approximate orientation ($\psi_m$, $\Theta_m$, $\phi_m$) available, and the problem is then linearized by writing:

$R(\psi_e,\theta_e,\phi_e)=R(\psi_m,\theta_m,\phi_m)r(\delta\psi_e,\delta\theta_e,\delta\phi_e)$ The 3 basic rotations ($\delta\psi_e$, $\delta\theta_e$, $\delta\phi_e$) are, to the same order, solution of a linear system.
2. or without using the attitude measurements. In this approach, the 9 parameters of the rotation matrix R are sought from the 9 relationships supplied by the 3 colinearity equations on the 3 landmarks. The advantage of this approach is that it resolves a linear system of 9 equations with 9 unknowns corresponding to the 9 parameters of the rotation matrix. The angles sought ($\psi_e$, $\theta_e$, $\phi_e$) are then obtained, by using $R_{ij}$ to denote the element of row i and column j of the matrix R, according to:

$\psi_e = \arctan 2(R_{12}, R_{11})$ $\theta_e = -\arcsin(R_{31})$ $\phi_e = \arctan 2(R_{32}, R_{33})$ Having a procedure to analytically compute the beam parameters by means of 3 landmark points, the availability of more than 3 points makes it possible to resolve the direct problem by linearizing the observation equations around the solution $(x_e, y_e, z_e, \psi_e, \theta_e, \phi_e)$ obtained in the preceding step.

Thus, by using reference image data, the proposed method can enhance and simplify the procedure for estimating the parameters (xe, ye, ze, ψe, θe, φe) by automatically pairing the image acquired with the range-found points with the reference datum.

For the different applications presented, one major benefit of the method according to the invention lies in the enhancement of the knowledge concerning the depression $\theta_e$, and the flight height $z_e$, which are the 2 parameters that are most sensitive to the geo-referencing balance sheet as described in the preamble with relation to FIG. 1.

The swing, or rotation $\phi_e$ of the detector about the COA also offers a benefit since this quantity is not always measured, nor even specified in terms of performance, according to the mechanization retained for the orientation of the head of the optronics sensor.

Another benefit of the approach lies in the consistency of the information used both on the complementarity of the nature of the errors (distance accuracy and angular precision) and on the order of performance close to a meter.

The acquisitions of the positioning and of the attitude measurements are not generally performed at the same times, or even at the image acquisition times. In this case, a step for synchronizing these acquisitions of measurements on the image acquisition times must be provided. These positionings and attitudes are also synchronized with the distance measurements.

Figure 3:
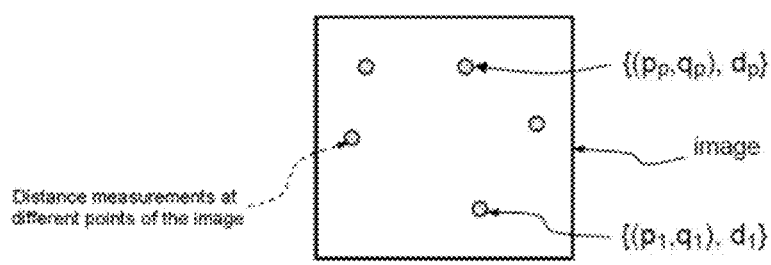

According to a first embodiment of the method, described in relation to FIGS. 2 and 3, a single image is acquired and P points are range-found in this image (M=K=1 in the two figures, P=3 in FIG. 2 and P=5 in FIG. 3). This makes it possible to perform the geo-referencing of the imaged area almost instantaneously with the acquisition of an adjustable number of distances by the range finder.

Figure 4:
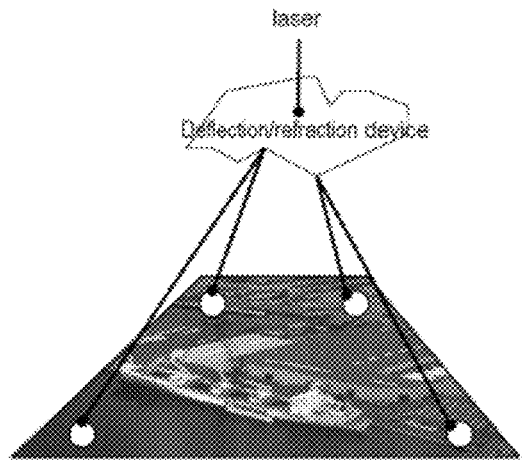

As illustrated in FIG. 4, to obtain these P distances in one and the same image, the range finder is, for example, equipped with means for splitting the beam emitted into P separate beams, each separate beam targeting a point to be range-found; in this case, the energy Ep of a separate beam is less than Et/P, Et being the total energy of the beam before it is split.

According to one alternative, the range finder is equipped with rapid beam-deflection means, this deflection being such that the time to acquire each distance is less than or equal to the ratio of the time to acquire this image to the number of range findings P. The most conventional laser beam-deflection techniques use prisms or rotating mirrors. It is also possible to use devices with orientable reflection or refraction elements, with birefringent deflector and with interferences. More recent techniques use acousto-optical components, MEMS to diffract the laser beam in different directions. A fiber optic system may also be used effectively to produce this function by providing the laser beams on the places that are preferred in terms of relative distribution in the image. This provision may be simultaneous with the different fibers or sequential so as to supply all the available laser power in each fiber. Under this principle, each fiber may be duplicated to analyze the signal on reception. The function may also be produced with a more dense spatial sampling by directly using a matrix detector simultaneously performing the imaging function and the range-finding function.

Whatever the approach used, it makes it possible to have a large number of range findings which enhances performance, through the redundancy of the distance measurements, and allows for their consistency checking in order to detect artefacts (of multiple-path type).

According to another alternative, the divergence of the laser of the range finder covers all of the image and the reception of the range finder is matrix-based.

Generally, the number of points range-found is the same for each image, but not necessarily.

The more range-found points there are in an image, the more efficient and robust is the result obtained.

Figure 5:
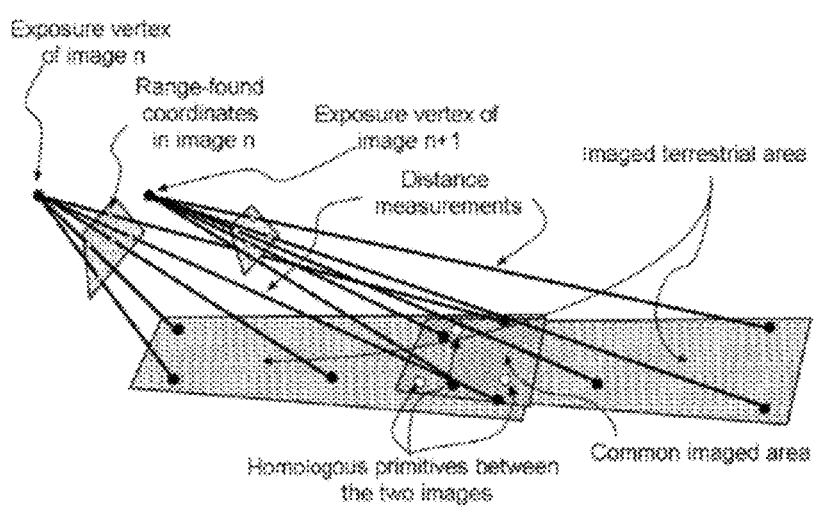

According to a second embodiment of the method, described in relation to FIGS. 5 and 6, M images are acquired in succession (with M>1) and P points are range-found in K images, with 1≤K≤M. This in a way is the same as the preceding embodiment, but extended to M images.

It will be noted that it is possible to form one large image from M images, but this is not essential in estimating the parameters $x_e, y_e, z_e, \phi_e, \theta_e, \psi_e$ of each image.

When there is more than one image, it is essential for the images to overlap at least two by two in order for them to be able to be mapped together. The overlap may vary within a wide range from a minimum of the order of 10% to almost 100% (a value of 60% corresponds to the conventional aerotriangulation conditions for the civilian applications in which the acquisitions are vertical). Two successive images are mapped together by using homologous primitives (representing the same details of the scene) belonging to the overlaps of the images. These primitives may be represented by points or segments or, more generally, forms parametrically describing the contours of the forms corresponding to elements visible in the scene. These form descriptors are obtained by an automatic processing operation suitable for extracting radiometric information characteristic of a one-off geometric form, linear or even surface-oriented, such as a (one-off) intersection of a road portion (linear) or the contour of a field (surface). These homologous primitives are independent of the range-found points.

In FIG. 5, M=K=2 and P=10 with 5 range-found points in each of the 2 images; there are 3 homologous points in the area of overlap of the two images.

Figures 6A, 6B:
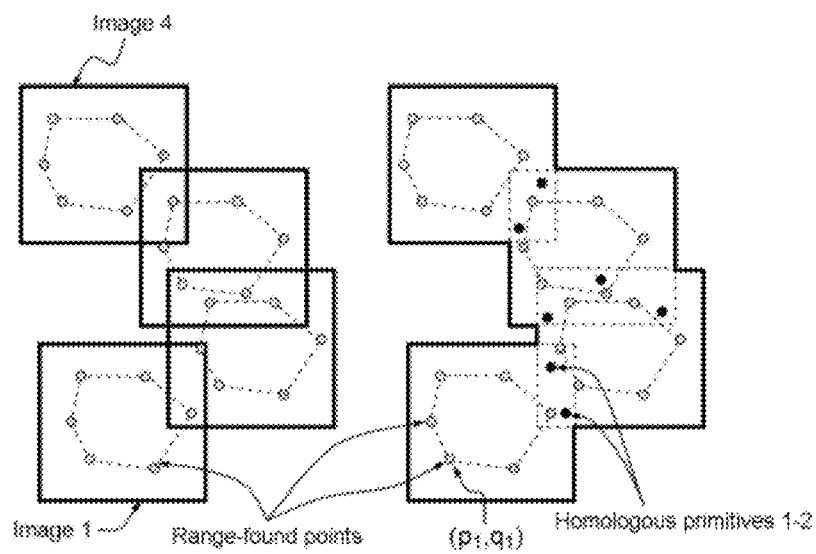

In FIG. 6A, M=K=4 and P=18 with 6 range-found points in each image. We have represented in this figure one and the same distribution (schematically represented by the dotted lines) within each image, although this distribution may vary in each image.

FIG. 6B illustrates the step of extracting homologous primitives and of mapping together the images, carried out by the processing unit 6. In the image portion common to images 1 and 2, called area of overlap of the two images, two homologous points are extracted; 3 homologous points are extracted in the area of overlap of the images 2 and 3, and 2 homologous points are extracted in the area of overlap of the images 3 and 4.

In some cases, these M successive images are acquired from a fixed optronics system, that is to say, one whose position $x_0, y_0, z_0$ does not change during the acquisitions. These images are, for example, acquired by detector scanning or by rotation of the platform. In this configuration, the geographic position of the sensor does not vary in the different acquisitions; its position $x_e$, $y_e$, $z_e$ can therefore be estimated just once. On the other hand, the attitudes change from one image to another and the orientations $\phi_e$, $\theta_e$, $\psi_e$ will therefore be estimated M times. Finally, when the system is fixed, 3M+3 external parameters characterizing the CPs are estimated.

The approach based on detector scanning presents the advantage of having a geo-referenced area of the desired size, greater than just the instantaneous field of the detector, conditioned by the time to acquire and the scanning speed. This capability makes it possible notably to perform the acquisition by prioritizing the use of a small field (NFOV, standing for Narrow Field Of View) rather than a large field (WFOV standing for Wide FOV) in order to have a better GSD on the information generally situated at a great distance. It can be implemented without any additional hardware cost, on a system that already has a range finder and a means for scanning the COA. This makes it possible to consider the upgrading of existing sensors.

When, furthermore, a number of distances are plotted on each of the images, the advantages of the approach based on scanning are combined with enhanced performance because of the redundancy of the distance measurements in the process of estimating the exposure parameters and the overlap area.

In other cases, these M successive images are acquired from an optronics system placed on a moving platform. In this case, its position changes over time. There will therefore generally be M estimations of position $x_e$, $y_e$, $z_e$ and of attitude $\phi_e$, $\theta_e$, $\psi_e$: M positioning and attitude parameters will be acquired $(x_m, y_m, z_m, \phi_m, \theta_m, \psi_m)$ then estimated $(x_e, y_e, z_e, \phi_e, \theta_e, \psi_e)$, or 6M parameters.

In this case also, the images can be acquired by scanning.

When the platform describes a known trajectory defined by a parametric model, the number of parameters to be estimated can be reduced by a modeling of the trajectory including N parameters.

The trajectory model makes it possible to constrain the change of position of the sensor (within a range in which the trend of the parameters is compatible with the kinematic capabilities of the system) and to have position values outside of the measurement times by filtering or interpolating the information. The trajectory model gives the position of the platform with, for example, the conventional polynomial expression of the following form in which $t_0$ is the origin or reference time and $OM^{(n)}$ is the n-th derivative of the position at the time $t_0$:

$$OM = \sum_{n=0}^{N} \frac{(t-t_0)^n}{n!} (OM^{(n)})_{t_0}$$

Since the acquisition interval corresponds to a short time period, a 2nd order development will generally be sufficient to account for any maneuver of the platform. Otherwise, if a higher degree time power polynomial has to be used, preference will be given to a development of the trajectory in the form of a spline curve in order to avoid any unrealistic oscillations that might appear with the preceding polynomial method. To illustrate the reduction of complexity which results from the modeling, it is sufficient to indicate that a modeling limited to acceleration comprises 9 parameters to be estimated whereas the number of components of positions generated in 1 second at an image rate of 50 Hz amounts to 150!

In the polynomial approach, the coefficients of the development can be obtained from a measurement of the kinematic characteristics at the instant $t_0$, whereas, for both approaches, the coefficients can be estimated from a number of measurements (position, speed) by an adjustment of least squared type. This procedure is elementary since the model is linear as a function of the values of the components on the three position, speed and acceleration components.

Thus, the establishment of the trajectory model is either based on a minimum of one set (time, position, speed) or from a number of sets and from a least squared estimation procedure. The resulting development makes it possible to determine the position of the platform (and therefore indirectly of the sensor) at the time of the measurements of the sensor in order to have synchronous information. If necessary, the same type of operation can be performed to synchronize the image measurements and range findings.

The trajectory parameters can be estimated in a way that is:
independent of that of the exposure parameters and refined over time at the rate of arrival of new positions. In this case, there is a process estimating the trajectory with 3N parameters and another estimating 3M CP parameters. The time of acquisition of each of the images is then used and the corresponding sensor positioning is computed as a function of the parametric model at these acquisition times,
dependent on the estimation of the exposure parameters and in this case the estimated vector contains both the trajectory and CP parameters, or 3N+3M parameters to be estimated.

Realistically, the number N of parameters will be equal to 6 or 9 depending on the possible maneuver of the trajectory over the time window for collection of the measurements.

Figures 7A, 7B:
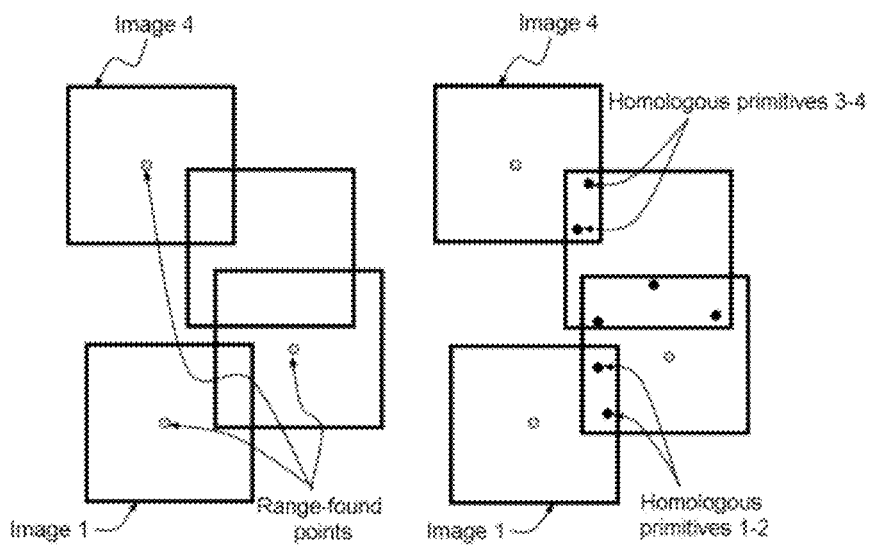

According to a third embodiment of the method, described in relation to FIGS. 7A and 7B and which is a particular case of the preceding embodiment, M images are acquired and P points are range-found in K images with K=P; there is therefore a single range-found point in each of the K images (M=4, K=P=3 in the figures). Since the range finder is harmonized with the COA of the detector, these range-found points are respectively at the center of each of the K images. As can be seen in FIG. 7B, 2 homologous points are extracted in the area of overlap between the images 1 and 2, three are extracted in the area of overlap between the images 2 and 3, and two are extracted in the area of overlap between the images 3 and 4. This approach does not require any material change to the existing equipment or equipment that is now envisaged.

It will also be noted that it is possible to have P>K. Some images may not have any range-found point, since they have homologous primitives with other images which themselves have range-found points.

The method according to the invention is triggered to acquire the environment of a particular geographic position. From the measured position of the sensor, an approximate orientation for the collection is deduced. The computation of the angular directions to be applied to the COA is then performed to take account of:
the desired surface on the ground,
the characteristics of the detector (field or "FOV"),
the overlap setpoint established between images (from 20 to 100%).

Since the orientation measurements have a better short term accuracy (between close images), and the number of images to be produced in azimuth is generally greater than that in bearing to acquire an area with similar dimensions, a greater overlap in bearing than in azimuth will preferably be chosen and a scanning will be performed first in azimuth then in bearing. The angular displacement deviation of the line of sight will then be greater between 2 bearing values than between 2 azimuth values.

The method according to the invention makes it possible to better determine the parameters which substantially affect the geo-referencing performance for strongly oblique exposures and in particular in aeroterrestrial operations comprising:
tactical airborne missions which necessitate remaining at a distance from the area of interest for reasons of security,
surveillance missions from terrestrial systems or systems moving at low altitude.

The invention claimed is:

1. A method for geo-referencing an area by means of an imaging optronics system which comprises a step of acquiring M successive images of the area by means of a detector, the area for which the step of acquiring is carried out being distributed between these M images, with M≥1, the method further comprising:
measuring P distances $d_1, d_2, \ldots, d_p$ between the system and P points of the area, called range-found points, with P≥3, these range-found points being distributed in K of said images with 1≤K≤M,
acquiring the positioning $x_m, y_m, z_m$ of the detector at the times of acquisition of the M images,
measuring the attitude ($\phi_m, \theta_m, \psi_m$) of the detector at the times of acquisition of the M images,
acquiring the coordinates in these K images of the points called image points $(p_1, q_1), (p_2, q_2), \ldots, (p_P, q_P)$ corresponding to the P range-found points, and
estimating the parameters of exposure conditions $x_e, y_e, z_e, \psi_e, \theta_e, \phi_e$ corresponding to the M images as a function of positionings, of attitudes, of distances and of coordinates of the image points, in order to correct the errors on the parameters $x_m, y_m, z_m, \psi_m, \theta_m, \phi_m$ of each of the M images,
wherein M≥3, and the M images of the area are acquired in succession, these images presenting areas of overlap two by two and further comprising extracting homologous primitives in the areas of overlap of these M images and mapping the images two by two on the basis of these homologous primitives, and
wherein when P=K, the range-found points are respectively at the center of each of the images.

2. The method for geo-referencing an area as claimed in claim 1, wherein the optronics system is fixed, the parameters $x_e, y_e, z_e$ are estimated only once.

3. The method for geo-referencing an area as claimed in claim 1, wherein, the optronics system comprising kinematic means for measuring the trajectory of the positioning system, speed, acceleration, and being mobile on this trajectory modeled in parametric form, the positionings $x_e, y_e, z_e$ are estimated for the positions at the times corresponding to that of the image acquisitions, range-finding.

4. The method for geo-referencing an area as claimed in claim 1, wherein, by using reference geo-referenced data, including automatically pairing the range-found points of the active image with these reference data.

5. A geo-referencing optronics system which comprises a detector having a Camera Optical Axis (COA), means for positioning the detector, means for measuring an attitude of the detector, a range finder harmonized with the COA of the detector, means for acquiring image coordinates of the range-found points, and a processing unit linked to the abovementioned elements, and configured to implementing the method as claimed in claim 1.

6. The geo-referencing optronics system which comprises a detector having a Camera Optical Axis (COA), means for positioning the detector, means for measuring an attitude of the detector, a range finder harmonized with the COA of the detector, means for acquiring image coordinates of the range-found points, wherein, the range finder emitting a laser beam, the geo-referencing optronics system is equipped with means for splitting or deflecting the emitted laser beam, and a processing unit is configured to implementing a method as claimed in claim 1.

* * * * *